United States Patent Office 3,529,952
Patented Sept. 22, 1970

3,529,952
PLANT CONTROL WITH 5-OXO-1,4,2-DIOXAZINES
Linus M. Ellis, Wilmington, Del., assignor to E. I. du Pont de Nemours and Company, Wilmington, Del., a corporation of Delaware
No Drawing. Continuation-in-part of application Ser. No. 567,818, July 26, 1966. This application Sept. 17, 1968, Ser. No. 760,345
Int. Cl. A01n 5/00, 9/20
U.S. Cl. 71—88    11 Claims

ABSTRACT OF THE DISCLOSURE 5-oxo-1,4,2-dioxazines such as 6-methyl-3-phenyl-1,4,2-dioxazine-5-(6H)-one are useful as plant growth regulants.

CROSS REFERENCE TO RELATED APPLICATIONS

This application is a continuation-in-part of my copending application Ser. No. 567,818, filed July 26, 1966, now U.S. Pat. No. 3,420,824.

SUMMARY OF THE INVENTION

In summary, this invention relates to methods of regulating plant growth, comprising applying to the plants an effective amount of a compound of the formula (1)
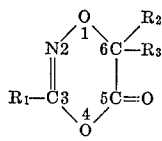

wherein $R_1$ and $R_3$ are the same or different and are hydrogen, aliphatic hydrocarbon of 1 to 12 carbon atoms, such hydrocarbon containing ethylenic unsaturation, such hydrocarbon substituted with up to 2 halogens of atomic number 9 to 35, aromatic hydrocarbon of up to 10 carbon atoms, such aromatic hydrocarbon substituted with up to 2 halogens of atomic number 9 to 35 or up to 2 lower alkoxy radicals, or pyridyl nitrogen heterocycles of 1 nitrogen and up to 6 carbon atoms; $R_2$ is hydrogen, alkyl of 1 to 4 carbon atoms or aromatic hydrocarbon of up to 7 carbon atoms;

with the proviso that $R_1$, $R_2$, and $R_3$ cannot be cyclic hydrocarbons concurrently and the total carbon content of $R_1$, $R_2$, and $R_3$ is not more than 12 carbon atoms.

Representative of 5-oxo-1,4,2-dioxazines of this invention are the following:

6-methyl-3-phenyl-1,4,2-dioxazine-5-(6H)-one;
3-phenyl-1,4,2-dioxazine-5-(6H)-one;
6-ethyl-3-phenyl-1,4,2-dioxazine-5-(6H)-one;
6-methyl-3-undecyl-1,4,2-dioxazine-5-(6H)-one;
3 - (2 - methylpropyl)-6-phenyl-1,4,2-dioxazine-5-(6H)-one;
6,6-dimethyl-3-phenyl-1,4,2-dioxazine-5-one;
3 - (2,6 - dichlorophenyl) - 6 - methyl-1,4,2-dioxazine-5-(6H)-one;
3-methyl-6-phenyl-1,4,2-dioxazine-5-(6H)-one;
3-tert-butyl-6-methyl-1,4,2-dioxazine-5-(6H)-one;
6-(1-methylpropyl)-3-(p-chlorophenyl)-1,4,2-dioxazine-5-(6H)-one;
6-methyl-3-(3-pyridyl)-1,4,2-dioxazine-5-(6H)-one;
6-methyl-3-cyclopentyl-1,4,2-dioxazine-5-(6H)-one;
6-propyl-3-phenyl-1,4,2-dioxazine-5-(6H)-one;
3-benzyl-6-methyl-1,4,2-dioxazine-5-(6H)-one;
3-hexyl-6-methyl-1,4,2-dioxazine-5-(6H)-one;
6-methyl-3-(3,4-dichlorophenyl)-1,4,2-dioxazine-5-(6H)-one;
3-(o-fluorophenyl)-1,4,2-dioxazine-5-(6H)-one;
6-methyl-1,4,2-dioxazine-5-(6H)-one;
3-ethyl-6-methyl-1,4,2-dioxazine-5-(6H)-one;
3-vinyl-6-methyl-1,4,2-dioxazine-5-(6H)-one;
3,6-dimethyl-1,4,2-dioxazine-5-(6H)-one.

Compounds of the above formula which are preferred for use in regulating plant growth are:

6-methyl-3-phenyl-1,4,2-dioxazine-5-(6H)-one;
3-phenyl-1,4,2-dioxazine-5-(6H)-one; and
3-(m-chlorophenyl)-1,4,2-dioxazine-6-methyl-5-(6H)-one.

These compounds are preferred because of their high order of activity in regulating plant growth. Most preferred of these is the compound 6-methyl-3-phenyl-1,4,2-dioxazine-5-(6H)-one because of its effectiveness as a sugar-increasing agent.

DESCRIPTION OF THE INVENTION

I have discovered that the compounds of Formula 1 above are effective in regulating plant growth. Moreover, the compounds of Formula 1 exhibit a particularly unique form of plant regulation in that when applied to sugar-containing plants at the proper time during their growth a surprising increase in the sugar content of the plant can be obtained. For sugarcane, sugar beets and sorghum, which are grown for sucrose production, this increase in sugar content is absorbed directly as an increase in the yield from a given area of crop plant. Obviously, increased sugar levels improve the palatability of the plant or plant parts and offer improved dietary value. While the mechanism involved in this increase in sugar content is not fully understood, it is apparent that the compounds of Formula 1 redirect the carbohydrate metabolism of the plant in such a way as to increase the sugar level in the plant juices.

PREPARATION

The compounds of Formula 1 can be prepared generally by liquid phase dehydration of α-amidooxy acids as described in my copending application Ser. No. 567,818, filed July 26, 1966.

The preparation of compounds of Formula 1 is further illustrated in Example 1 below.

COMPOSITIONS

The compounds of Formula 1 can be formulated with traditional pest control adjuvants or modifiers to obtain compositions in the form of dusts, solutions, water-soluble and dispersible powders, aqueous dispersions, emulsions and high strength compositions.

Thus the 5-oxo-1,4,2-dioxazines of this invention can be formulated with a carrier or diluent, such as a finely divided solid, an organic solvent liquid, water, a wetting agent, a dispersing agent, an emulsifying agent, an aqueous emulsion, or any suitable combination of these.

Formulations of 5-oxo-1,4,2-dioxazines, especially liquids and wettable powders, usually contain as a conditioning agent one or more surface-active agents in amounts sufficient to render a given composition readily dispersible in water or oil. The term "surface-active agent" as used herein is understood to include wetting agents, dispersing agents, emulsifying agents and suspending agents.

Suitable surface-active agents are listed in "Detergents and Emulsifiers 1967 Annual" by John W. McCutcheon, Inc. Ordinarily, less than 10 percent by weight of surface-active agent is used in the compositions of this invention and frequently less than 2 percent by weight is adequate. However, levels as high as 5 parts of surface-active agent for each part of 5-oxo-1,4,2-dioxazine of this invention gives unusual and unexpected beneficial results. Such compositions demonstrate activity greater than can be expected from the activity of the components used separately. Representative of suitable formulations are set out below.

Because the 5-oxo-1,4,2-dioxazines of this invention react with compounds containing active hydrogen and are hydrolyzed by water, it is preferred that they be formulated in nonaqueous systems and in systems not containing an active hydrogen. However, at ordinary temperatures, reaction rates are relatively slow so that formulations containing amines, hydroxyl-containing compounds or water can be prepared if they are to be used relatively soon.

(a) Wettable powders

Wettable powders are water-dispersible compositions containing the active material, an inert solid extender, and one or more surfactants to provide rapid wetting and prevent heavy flocculation when suspended in water.

The extenders preferred for use in preparing the wettable powders of this invention are of mineral origin and the surfactants are preferably anionic or non-ionic. The classes of extenders most suitable for the wettable powder formulations of this invention are the natural clays, diatomaceous earth, and synthetic mineral fillers derived from silica and silicate. Among non-ionic and anionic surfactants, those most suitable for the preparation of the dry, wettable formulations 5-oxo-1,4,2-dioxazines of this invention are solid forms of compounds known to the art as wetters and dispersants. Occasionally a liquid, non-ionic compound classified primarily as an emulsifier may serve as both wetter and dispersant, but such types are usually avoided because of the difficulty in obtaining homogeneous distribution through the solid mass.

Most preferred fillers for the compositions of this invention are kaolinites, attapulgite clay and synthetic magnesium silicate. Preferred wetting agents are alkylbenzene and alkylnaphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium-N-methyl-N-(long-chain acid) taurates.

Wetting and dispersing agents in the preferred wettable powder compositions of this invention are usually present at concentrations of from about 0.5 weight percent to 5 weight percent. The inert extender completes the formulation. Where needed, 0.1 weight percent to 1.0 weight percent of the extender may be replaced by a corrosion inhibitor or an anti-foaming agent, or both.

Thus, wettable powder formulations of the compounds of Formula 1 will ordinarily contain from about 25 to 90 percent active material, from 0.5 to 2.0 weight percent wetting agent, from 0.25 to 5.0 weight percent, dispersant, and from 9.0 to 74.25 weight percent inert extender as these terms are described above.

When the wettable powder contains a corrosion inhibitor or an anti-foaming agent or both, the corrosion inhibitor will not exceed about 1 percent of the composition and the anti-foaming agent will not exceed about 0.5 percent by weight of the composition, both replacing equivalent amounts of the inert extender.

(b) Aqueous suspensions

Aqueous suspensions are prepared by mixing together and sand-grinding an aqueous slurry of water-insoluble active ingredient in the presence of dispersing agents to obtain a concentrated slurry of very finely divided particles in which the active ingredient is substantially all below 5 microns in size. The resulting concentrated aqueous suspension is characterized by its extremely small particle size, so that when diluted and sprayed coverage is very uniform.

(c) Dispersible powders

Water-dispersible powders are prepared from the water-soluble compounds of this invention. In some instances the dry formulation is dissolved in water without any other additive present and the resultant aqueous solution is sprayed on the locus to be treated. In other cases finely divided inert solid extenders and surfactants are blended with the active ingredient. Upon extension with water the active component first disperses and then dissolves.

(d) Dusts

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing solid extender.

Their performance is sometimes aided by the inclusion of a wetting agent, and convenience in manufacture frequently demands the inclusion of an inert, absorptive grinding aid. For the compounds of this invention, the inert extender may be either of vegetable or mineral origin, the wetting agent is preferably anionic or non-ionic, and suitable absorptive grinding aids are of mineral origin.

Suitable classes of inert solid extenders for use in preparing dusts are those organic or inorganic powders which possess high bulk density and are very free-flowing. They are also characterized by possessing relatively low surface areas and are poor in liquid absorption. Suitable classes of grinding aids are some natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation, some liquid non-ionic agents are also suitable in this invention.

Preferred inert solid extenders for the dusts of this invention are micaceous tales, pyrophyllite, dense kaolin clays, ground calcium phosphate rock such as that known as "Phosphodust" (a trademark of the American Agricultural Chemical Company) and tobacco dust.

Preferred grinding aids are attapulgite clay, diatomaceous silica, synthetic fine silica and synthetic calcium and magnesium silicates. Preferred wetting agents are those previously listed under wettable powder formulations.

The inert solid extenders in the dusts of this invention are usually present in concentrations of from about 30 to 90 weight percent of the total composition. The grinding aid will usually constitute 5 to 50 weight percent of the composition and the wetting agent will constitute from about 0 to 1.0 weight percent of the composition. Dust compositions can also contain other surfactants such as dispersing agents in concentrations of up to about 0.5 weight percent.

The wettable powders described above may also be used in the preparation of dusts. While such wettable powders could be used directly in dust form, it is more advantageous to dilute them by blending with the dense dust diluent. In this manner, dispersing agents, corrosion inhibitors and anti-foam agents may also be found as components of a dust.

Thus, the dust compositions of this invention will ordinarily comprise about 5 to 20 weight percent active material, 5 to 50 weight percent absorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

(e) Emulsifiable oil concentrates

Emulsifiable oil concentrates are usually solutions or dispersions of active material in non-water-miscible solvents together with a surfactant.

For the compounds of this invention, emulsifiable oils can be made by mixing the active ingredients with a non-aqueous carrier and surfactant. Suitable carriers for the compounds of this invention are hydrocarbons (substituted or unsubstituted), and non-water-miscible ethers, esters, or ketones. Suitable surfactants are those anionic or non-ionic agents known to the art as emulsifying agents.

Emulsifying agents most suitable for the compositions of this invention are alkylaryl polyethoxy alcohols, alkyl and alkylaryl polyether alcohols, polyoxethylene sorbitol or sorbitan fatty acid esters, polyethylene glycol fatty esters, fatty alkylol amide condensates, amine salts of fatty alcohol sulfates plus long chain alcohols, and oil-soluble petroleum sulfonates. Such emulsifying agents will comprise from about 3 to 10 weight percent of the total composition. As described above, however, up to 5 parts of emulsifying agent for each part of active compound can be used to give synergistic results.

Thus, emulsifiable oil compositions of the present invention will ordinarily consist of from about 15 to 50 weight percent active material, about 50 to 82 weight present solvent and about 3 to 10 weight percent emulsifier, as these terms are defined and used above.

High-strength compositions will contain 90 to 99 percent active material together with 0.5 to 10 percent surfactant and 0 to 9.5 percent of anti-caking agent.

APPLICATION

It will be appreciated that the amount of a compound of Formula 1 that will be effective to regulate plant growth will vary, for example, with the particular crop involved, plant density, the type of formulation and application method utilized, prevailing weather conditions and the particular active ingredient utilized. Since many factors are involved, it is not possible to indicate generally one rate of application which is preferred or even suitable for all situations. However, effective resolution of these factors in determining the effective amount in any given situation is well within the ability of persons of ordinary skill in the art.

Compounds of Formula 1 can be used to retard the growth of grasses. When applied at rates of 1 to 16 kilograms per hectare to freshly trimmed bluegrass, growth of the grass is retarded, reducing the labor required to maintain an attractive grass area.

At higher rates of use the compounds of Formula 1 exert other plant regulatory action and may act as herbicides. For example, rates of 4.0 to 30 pounds per acre of some 5-oxo-1,4,2-dioxazines as foliar soil sprays give excellent control of established quack grass as well as Johnsongrass seedlings. Rates of 6 to 20 pounds per acre as pre-emergence sprays control other vegetation such as giant foxtail, pigweed, and chickweed.

Compounds of Formula 1 are generally applied to sugar-containing crops at rates of from about 0.5 to 10.0 pounds per acre 10 to 60 days prior to normally scheduled harvest, 20 to 40 days being preferred.

There follow some illustrative examples which describe the preparation of compounds and compositions of this invention and their use. In these examples, parts and percentages are by weight unless otherwise noted.

EXAMPLE 1

The preparation of 6-methyl-3-phenyl-1,4,2-dioxazine-5-(6H)-one is carried out in the following two steps.

(A) The preparation of 2-(benzamidooxy) propionic acid

A mixture of 274 parts of benzohydroxamic acid, 950 parts of absolute alcohol and a solution of 160 parts of sodium hydroxide in 800 parts of distilled water is placed in a reaction vessel equipped with a stirrer and packed in a bath containing about 15,000 parts of ice-water mixture. When the mixture is thoroughly chilled, 306 parts of $\alpha$-bromopropionic acid are added and the mixture is stirred in the bath for 16 hours. The bath is then removed, and the mixture, is stirred at reflux for 0.5 hour. Alcohol is then removed by distillation under water pump vacuum, and the residue is diluted with 300 parts of distilled water. Concentrated hydrochloric acid (180 parts) is added and the acidified solution is extracted with two portions of ethyl acetate totalling about 1350 parts. The extract is dried by filtration first through a bed of sodium chloride and then through a bed of anhydrous magnesium sulfate.

The dried filtrates from two preparations made as described above are combined, and most of the solvent is evaporated on a steam bath. Solids that separate on cooling are collected on a filter, dried, and recrystallized from ethyl acetate. The weight of 2-(benzamidooxy)propionic acid obtained is 544 parts (65% of theory), M.P. 129.5–130.5° C.

(B) The preparation of 6-methyl-3-phenyl-1,4,2-dioxazine-5-(6H)-one

Ten parts of 2-(benzamidooxy)propionic acid is dissolved in 88 parts of tetrahydrofuran. Twenty parts of acetic anhydride and about one-tenth part of concentrated hydrochloric acid are added, and the resulting solution is allowed to stand 96 hours in a stoppered flask. The solution is then poured into several volumes of water. An oily layer separates, and solidifies on standing. This solid is collected on a filter, washed with water, dried, and recrystallized from petroleum ether. Four parts of solid with a melting point of 65.5–66.5° C. is obtained. Analytical data corresponds to a compound resulting from abstraction of a molecule of water from a molecule of 2-(benzamidooxy)propionic acid.

*Analysis.*—Calc'd for $C_{10}H_9NO_3$ (percent): C, 62.77; H, 4.75; N, 7.33. Found (percent): C, 62.78, 62.83; H, 5.16, 5.17; N, 7.27.

(C) Another preparation carried out by the above procedure using 20 parts of 2-(benzamidooxy)propionic acid and proportionate quantities of other materials gives as product 13 parts of 6-methyl-3-phenyl-1,4,2-dioxazine-5-(6-H)-one, (alternatively, 6-methyl-3-phenyl-5,6-dihydro-1,4,2-dioxazine-5-one), M.P. 66–67 C. A small portion of this material thoroughly mixed with an equal quantity of the previous product also gives a melting point of 66–67° C. Infrared spectra of the two products are substantially identical. 6-methyl-3-phenyl-1,4,2-dioxazine-5-(6H)-one is a strong growth retardant on grasses when applied pre- or post-emergence by spraying a solution at a rate equivalent to 16 lb./acre. It is also an effective growth retardant at 2 lb./acre in post-emergence tests, giving about 40 percent control of tobacco suckering.

EXAMPLE 2

A formulation is made up from the following ingredients:

| | Percent |
|---|---|
| 6-methyl-3-phenyl-1,4,2-dioxazine-5-(6H)-one | 10 |
| Diatomaceous silica | 30 |
| Micaceous talc | 60 |

The above dust is prepared by blending and grinding the active material with the minor diluent, then blending the resulting powder with the major diluent.

Ten pounds of the dust formulation described above (1 pound of active ingredient) is dusted on the foliage of an acre of sugarcane or syrup-type sorghum. Application is made approximately six weeks before harvest. The treatment retards the growth of the plant and causes it to ripen. When harvested, sap from treated plants contains a higher percentage of sucrose than sap from untreated plants.

EXAMPLE 3

A formulation is made up from the following ingredients:

| | Percent |
|---|---|
| 3 - (m-chlorophenyl)-6-methyl-1,4,2-dioxazine-5-(6H)-one | 15 |
| Sodium lauryl sulfate | 60 |
| Synthetic fine silica | 25 |

The above composition is prepared by blending, grinding and reblending the components.

The above composition is applied in the spring at the rate of 25 pounds of active ingredient to an acre infested with seedling Johnsongrass and barnyardgrass. The treatment effectively controls these species.

The above composition is dispersed in water to give 4 kilograms of active ingredient in 400 liters of water. This suspension is sprayed on one hectare of sugarcane with a high pressure, high clearance, field sprayer, 6 weeks before harvest. Cane thus treated produces a greater yield of sugar than untreated cane.

EXAMPLE 4

A wettable powder is prepared by mixing the following ingredients and grinding in a hammer mill until the particle size of the active ingredient is substantially all below 50 microns:

| | |
|---|---|
| 6-methyl-3-phenyl-1,4,2-dioxazine-5-(6H)-one | 60.0 |
| Attapulgite clay | 25.0 |
| Sodium alkylnaphthalene sulfonate | 3.0 |
| Fine silica | 10.0 |
| Sodium lignosulfonate | 2.0 |

Three kilograms of active ingredient or the above formulation are suspended in 400 liters of water and applied to sugarcane 5 weeks before harvest. The cane is growing in a wet tropical area where it does not ripen well. The treatment hastens ripening and results in a higher percentage of sucrose in the treated cane stalks and a higher yield of sucrose per ton of cane handled.

EXAMPLE 5

Four kilograms of active ingredient formulated as described in Example 4, are suspended in 500 liters of water and sprayed on a hectare of freshly cut bluegrass growing along a highway right-of-way. The application is made in late April. This treatment retards the growth of the grass sufficiently that only one other mowing is necessary to maintain the grass in an attractive condition through the spring and summer.

EXAMPLES 6 AND 7

Examples 2 and 3 are repeated substituting 3-phenyl-1,4,2-dioxazine-5-(6H)-one for the 5-oxo-1,4,2-dioxazines specified in Examples 2 and 3, and when applied in the manner described in those examples gives similar results.

I claim:
1. A method for regulating plant growth comprising applying to the locus of the plant an effective amount of a compound of the formula

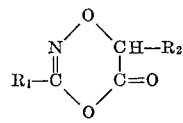

wherein $R_2$ is hydrogen, methyl or ethyl; and
$R_1$ is phenyl or monochlorophenyl.

2. The method of claim 1 wherein the compound is 6-methyl-3-phenyl-1,4,2-dioxazine-5-(6H)-one.

3. The method of claim 1 wherein the compound is 3(m-chlorophenyl)-6-methyl-1,4,2-dioxazine-5(6H)-one.

4. A method for increasing the sugar content of sugar cane and sorghum crops comprising applying to the locus of the crop an effective amount of a compound of the formula

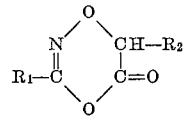

wherein $R_2$ is hydrogen, methyl or ethyl; and
$R_1$ is phenyl or monochlorophenyl.

5. The method of claim 4 wherein the compound is 6-ethyl-3-phenyl-1,4,2-dioxazine-5-(6H)-one.

6. The method of claim 4 wherein the compound is 3-phenyl-1,4,2-dioxazine-5-(6H)-one.

7. A plant growth regulant composition comprising a diluent and an effective amount of a compound of the formula

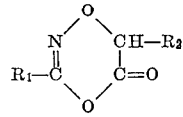

wherein $R_2$ is hydrogen, methyl or ethyl; and
$R_1$ is phenyl or monochlorophenyl.

8. A plant growth regulant composition of claim 7 wherein the compound of the formula is 6-methyl-3-phenyl-1,4,2-dioxazine-5-(6H)-one.

9. A plant growth regulant composition of claim 7 wherein the compound of the formula is 3-(m-chlorophenyl)-6-methyl-1,4,2-dioxazine-5-(6H)-one.

10. A plant growth regulant composition of claim 7 wherein the compound of the formula is 3-phenyl-1,4,2-dioxazine-5-(6H)-one.

11. A plant growth regulant composition of claim 7 wherein the compound of the formula is 6-ethyl-3-phenyl-1,4,2-dioxazine-5-(6H)-one.

References Cited

UNITED STATES PATENTS

| 3,352,662 | 11/1967 | Klopping et al. | 71—88 |
| 3,232,736 | 2/1966 | Seefelder | 71—88 |

LEWIS GOTTS, Primary Examiner

C. L. MILLS, Assistant Examiner

U.S. Cl. X.R.

71—76, 78